Sept. 7, 1937.  H. G. UHL  2,092,684
SHEAR PLATE
Filed Jan. 18, 1935    2 Sheets-Sheet 1
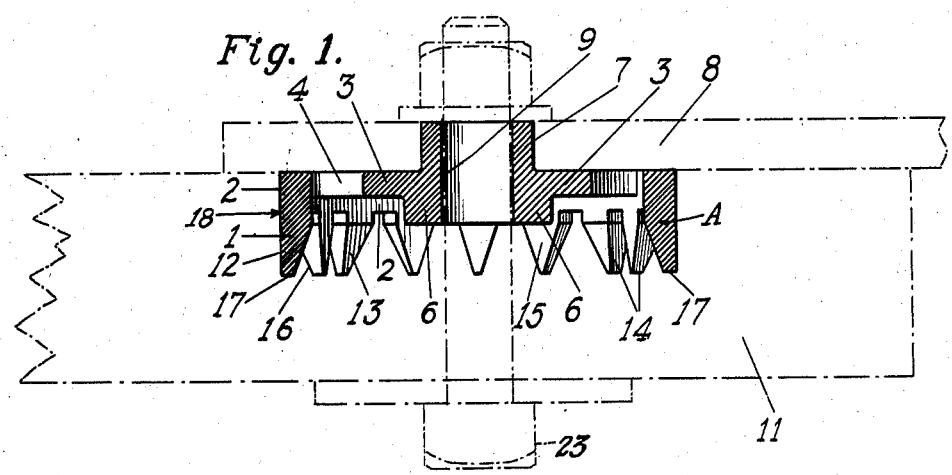
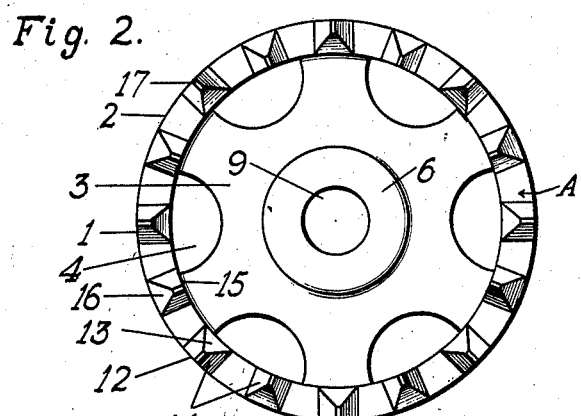
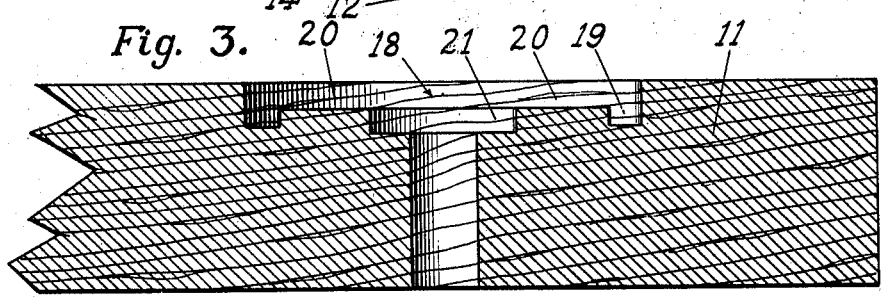
Inventor
Harry G. Uhl
By Browne & Phelps
Attorneys Sept. 7, 1937.    H. G. UHL    2,092,684
SHEAR PLATE
Filed Jan. 18, 1935    2 Sheets-Sheet 2
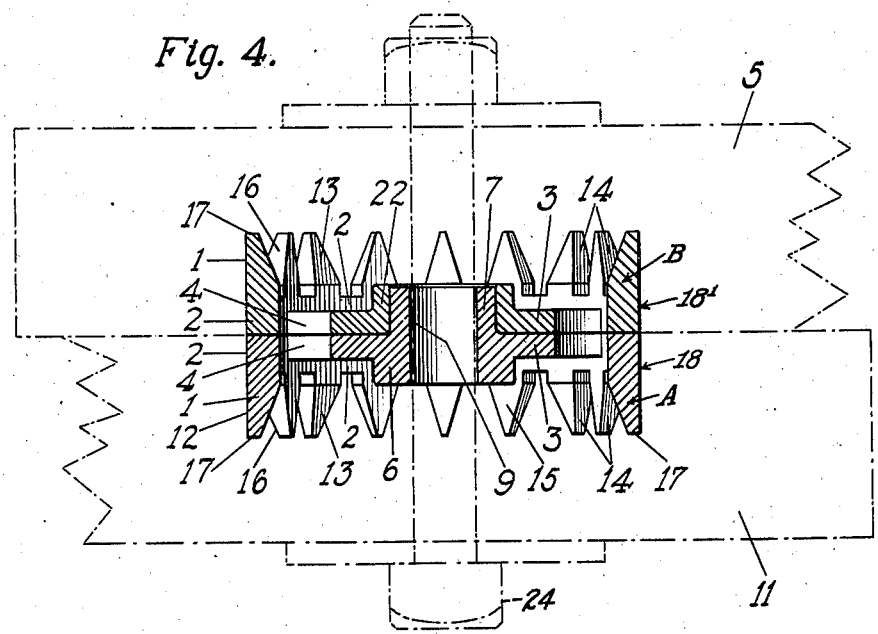
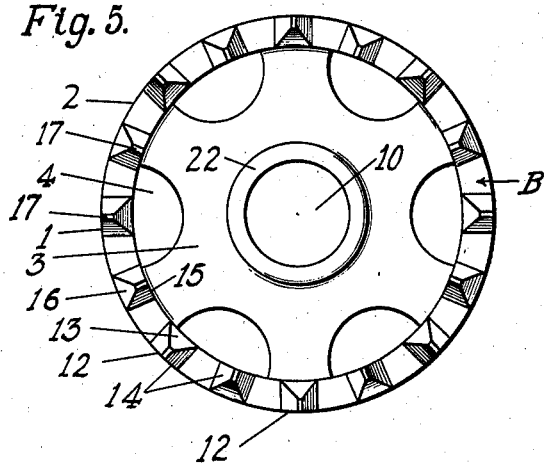
Inventor
Harry G. Uhl
By
Attorneys Patented Sept. 7, 1937

2,092,684

UNITED STATES PATENT OFFICE 2,092,684

SHEAR PLATE

Harry Grant Uhl, Washington, D. C., assignor to Timber Engineering Company, Washington, D. C., a corporation of Delaware Application January 18, 1935, Serial No. 2,449

4 Claims. (Cl. 20—92)

This invention relates to shear plates designed for a transmission of load from one structural member to another, and generally aims to provide a construction which requires minimum pressure for dapping or installation in pre-cut grooves or recesses in wood to simplify the assembly of the structural members.

It is broadly aimed to provide a novel construction wherein the bearing area of the plate on the wood is materially increased and danger of undue tilting minimized, through the provision of a novel hub flange, and the structure generally reinforced by said flange, and a reduced hub flange extending from the opposite side of the plate to coact with a metallic structural member or supplementary shear plate.

Still another object is to provide a construction wherein the first mentioned and supplementary shear plates will be accommodated in recesses or grooves to the end that the same tools may be used in providing them.

In addition, an object is to provide a shear plate adapted to be cast with the free ends or tips of the anchoring teeth blunt or somewhat flattened, so as to minimize the casting failures.

The most specific objects and advantages will be apparent from a consideration of the following description taken in connection with the accompanying drawings, illustrating an operative embodiment.

In the drawings:

Figure 1 is a phantom view illustrating the shear plate in diametric section and as bolted to a wooden structural member and a metallic member;

Figure 2 is a bottom or inverted plan view of said shear plate;

Figure 3 is a sectional view through the structural member, illustrating the recess or groove into which the shear plate is dapped;

Figure 4 is a side phantom view, illustrating the previously mentioned shear plate and the supplementary shear plate bolted to wooden structural members; and, Figure 5 is a plan view of said supplementary shear plate.

Referring specifically to the drawings, wherein like reference characters designate like or similar parts, A designates a shear plate which is preferably a metallic casting having a series of anchoring teeth 1 disposed around an annular rim 2 and projecting at right angles to the exposed surface of the plate. The plate proper is designated 3, and has half circular perforations or openings 4 to reduce the weight, and said rim 2 extends slightly below the perforated plate to strengthen the latter, rim 2 being of the same thickness as the teeth 1.

Said teeth 1 are evenly spaced around the rim 2 and are of a minimum number to facilitate embedding without reducing the load carrying capacity of the shear plates. Alternate teeth 1 have outside vertical faces 12, and inside faces 13 sloping toward the tips 17 of the teeth. The remaining teeth have a vertical face 15 on the inside with an outside sloping face 16. The side faces 14 of all the teeth have the same slope. The spaces between the teeth is great enough to avoid seriously crushing or destroying the wood fibers between or around the teeth during the embedding process.

The tip of each tooth is blunt at 17, that is, is provided with a small flat surface to insure more perfect manufacture in casting with fewer failures due to imperfect tip formation.

On the same face as the teeth, the shear plate has a broad shallow hub flange 6 while the deep hub flange 7 is formed on the opposite face, which, in some instances, fits into a hole in a steel structural member 8. Said hubs or flanges 6 and 7 are concentric and surround a bolt hole 9.

A groove, recess, or dap 18 is cut into the wood, as detailed in Figure 3, to receive the shear plate, and consists of an outer groove 19 for the rim 2, a shallow portion 20 for the plate 3, and a deeper inner portion 21 for shallow hub flange 6.

A bolt 23, which primarily serves to hold the members together, is passed through the hole 9 and the wooden member 11.

A supplementary shear plate B is shown in Figures 4 and 5, which is employed when a wooden beam 5 is used instead of metallic structural member 8, and plate B is of the same construction and dimensions as shear plate A, except that the center portion has a hub flange 22 surrounding a center opening 10, which flange telescopes over the deep hub flange 7 of the shear plate A. Hub flange 22 is of the same outside diameter as hub flange 6 and as the dimensions of shear plate B are the same as shear plate A, said shear plate B is dapped into a recess or groove 18' in structural element B of the same shape and size as that at 18. When installed, both shear plates are completely and snugly embedded in the wood at the recesses 18 and 18' with the outer flat surfaces of part 3 of the plates flush with the surfaces of the wooden members 11 and 5, respectively, as shown in Figure 4. A bolt 24, primarily serving to hold the members together, is passed through opening 9 and wooden members 5 and 11, as in Figure 4.

The shallow hub flanges 6 and 22 at the center of the shear plates increase the bearing area of the plates on the wood, the deep hub flange 7 affording necessary bearing area for hub flange 22. The hub flange 7 is designed to the proper thickness to carry the load developed by the plate over to either the steel member 8 or the supplementary shear plate.

When the load to be transmitted from one wooden member, such as 11, to a steel member, such as 8, exceeds the capacity of one shear plate, the load is borne by two or more shear plates, the joining arrangement being similar to that shown for one shear plate, as in Figure 1. And when the load to be transmitted from one wooden member, such as 11, to another wooden member, such as 5, exceeds the capacity of one pair of shear plates A and B, the load is borne by two or more pairs of plates A and B, the joining arrangement being similar to that shown in Figure 4. The shear plates in either instance may be placed in a line parallel with the sides of the members, or staggered, as preferred.

Assembly of the structural members of steel, at 8, and wood, at 11, or of wood alone, at 5 and 11, is simplified by dapping the shear plates in place during fabrication, so that the assembly consists only of placing and tightening the bolt 9 or 9'.

Various changes may be resorted to within the spirit and scope of the invention.

I claim as my invention:

1. A shear plate structure comprising, in combination: a plate having an opening for a securing element; an annular flange about said opening; teeth projecting from said plate at the same side thereof as said flange and disposed outwardly of said flange; an annular flange about said opening extending from the opposite side of the plate from the first named flange; said last named flange of substantially one-half of the radial thickness of the first named flange.

2. A shear plate structure for transmitting load from one structural member to another, comprising: a plate having an opening therethrough for a securing element; a flange and securing teeth projecting from one side of said plate, said flange about, and its interior forming a continuation of, said opening; a second flange projecting from the remaining side of said opening; said second flange being about, and its interior also forming a continuation of, said opening.

3. A shear plate structure for transmitting load from one structural member to another, comprising: a plate having an opening therethrough for a securing element; a flange and securing teeth projecting from one side of said plate, said flange about, and its interior forming a continuation of, said opening; a second flange projecting from the remaining side of said opening; said second flange being about, and its interior also forming a continuation of, said opening; a structural member in which said shear plate structure is embedded to the base of the second mentioned flange; a structural member through which the second mentioned flange passes; and a securing element passing through said opening and the first mentioned structural member.

4. A shear plate structure for transmitting load from one structural member to another, comprising: a plate having an opening therethrough for a securing element; a flange and securing teeth projecting from one side of said plate, said flange about, and its interior forming a continuation of, said opening; a second flange projecting from the remaining side of said opening; said second flange being about, and its interior also forming a continuation of, said opening; a supplementary shear plate having an opening telescoping with the exterior of the second named flange of the first mentioned plate; said supplementary shear plate having a flange and securing teeth projecting from one side thereof and at the opposite side of the assembly from the teeth and first-mentioned flange of the first named plate; the flange of the supplementary plate telescoping over the second named flange of the first named plate and having an external diameter substantially equal to that of the first named flange of the first named plate.

HARRY GRANT UHL.